Feb. 2, 1960    J. W. STEWART    2,923,016
MACHINE FOR OPERATING ON THE BOTTOMS OF SHOES
Filed May 31, 1957    2 Sheets-Sheet 2

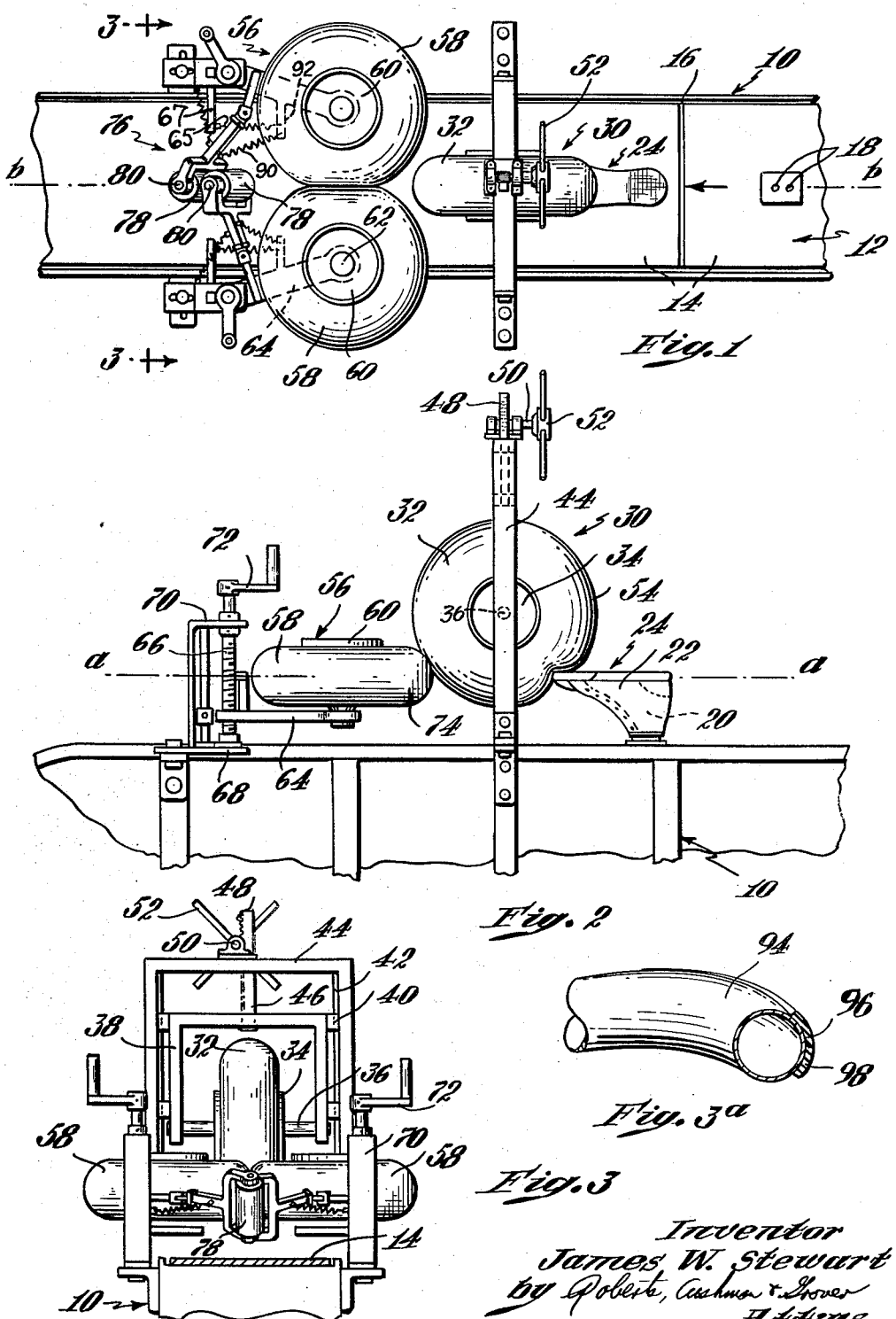

Inventor
James W. Stewart
by Roberts, Cushman & Grover
Attys

United States Patent Office 2,923,016
Patented Feb. 2, 1960

2,923,016

MACHINE FOR OPERATING ON THE BOTTOMS OF SHOES

James William Stewart, Providence, R.I., assignor to Marbill Company, Providence, R.I., a corporation of Rhode Island Application May 31, 1957, Serial No. 662,766

3 Claims. (Cl. 12—1)

This invention relates to machines for operating on the bottoms of shoes and has for its principal objects to provide a machine for rolling and consolidating the several bottom and edge layers which are conventionally used in the manufacture of fabric and rubber footwear; in which the rolling and consolidating instrumentalities will apply pressure with greater uniformity than has heretofore been possible; in which the instrumentalities will apply pressure simultaneously to the tread surface of the bottom and to the sides thereof; in which the instrumentalities will apply the pressure uniformly to the tread surface and the edge surfaces regardless of their area and shape and of the surface irregularities therein, so as to stress the layers and to exclude all bubbles and/or air pockets between layers; and in which the instrumentalities will combine to prevent rising of any parts, areas or edges of the several layers making up the bottom as pressure is applied successively from one part to another during consolidation. Other objects are to provide a machine which is readily adjustable to accommodate different size shoes and to vary the pressure available for consolidation. Still other objects are to provide a machine which is designed for rapid output, requires very little skill for its operation, is comprised of readily available parts so that it is comparatively inexpensive to manufacture, is durable and requires little upkeep.

As herein illustrated the machine has a carrier movable in a predetermined path which mounts shoe supporting means for moving shoes assembled thereon along the path, preferably in a horizontal plane bottom up, relative to instrumentalities for operating on the tread surface of the bottom and sides in a manner to roll and consolidate the several layers of which the bottom is made up. The aforesaid instrumentalities are a cushion member mounted above the carrier in the path of movement of a supported shoe for rolling contact with the tread surface of the bottom of the shoe as the latter is advanced therebeneath, the cushion having a bottom contacting surface which is adapted to be displaced by the tread surface of the bottom to an extent such that the tread surface and opposite sides of the bottom will be enveloped thereby, and pressure will be applied both perpendicular to the bottom of the shoe and laterally to the opposite sides of the shoe. Beyond the bottom applying cushion in the direction of movement of the shoe there is a pair of similar cushion members arranged to have contact with the sides of the shoe which have surfaces adapted to roll along the sides of the shoe as the latter moves therebetween, the surfaces normally having tangential contact along a line which coincides with the center line of movement of the shoe. The several cushions are adjustably supported for vertical movement with reference to the plane of the shoe bottom and as herein shown are in the form of pneumatically inflated annular tubes adapted to rotate respectively around a horizontal axis parallel to the plane of the shoe bottom and crosswise thereof, and spaced parallel axes perpendicular to the plane of the shoe bottom and at opposite sides thereof. Beyond the pair of cushion members in the direction of movement of the shoe there is a second pair of rollers mounted on axes inclined upwardly and forwardly with reference to the plane of the shoe bottom and are swingable laterally with reference to the sides of the shoe bottom. The mounting for these rollers is such that each roller normally occupies a position in which its axis lies on the center line of movement of the shoe and there is means urging these rollers to take up this position with one roller behind the other in the direction of movement of the shoe. The inclined roller operates exclusively on the sides of the shoe bottom.

The carrier for the shoe support is preferably of the type which may be moved continuously to advance shoes from a place of loading to the operating instrumentalities and beyond them to a place where they may be removed such for example as a continuous link or chain conveyor, as shown herein, or a horizontal rotatable table or platform.

The invention will now be described in greater detail with reference to the accompanying drawings wherein:

Fig. 1 is a plan view of the machine showing only that portion of the carrier above which are located the rolling and consolidating instrumentalities, the end portions of the carrier and supporting frame being omitted;

Fig. 2 is a side elevation of the machine as shown in Fig. 1;

Fig. 3 is an end elevation as seen in the directions of the arrows 3—3 of Fig. 1;

Fig. 3a is a perspective of a consolidating roll with a modified tread surface;

Figures 4, 5:
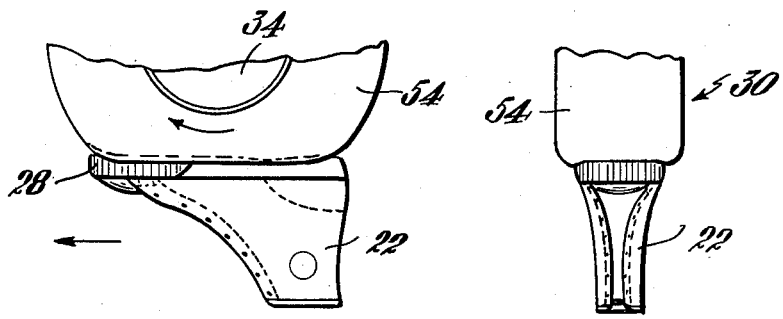
Fig. 4 is a fragmentary elevation to larger scale showing the consolidating roller which operates on the tread surface of the shoe bottom and overlaps on to the sides of the shoe.
Fig. 5 is an elevation as seen from the left-hand side of Fig. 4.

Referring to Figs. 1 to 3, there is shown a base frame 10 on which there is mounted for movement in the direction of the arrow (Fig. 1) and in a horizontal plane a conveyor 12 which is made up of a plurality of plates 14 joined by hinge means 16 at their adjacent edges. The mode of driving the conveyor is not necessary to an understanding of the invention and hence the particulars with reference to this part of the machine will be omitted except insofar as to say that there is means for advancing the conveyor continuously so that its upper horizontal run travels linearly with reference to the rolling and consolidating instrumentalities which will be described hereinafter and there is means for stopping and starting the conveyor when desired.

Each of the plates 14 has mounted thereon means for supporting a last and as herein shown is a pair of rigid vertically disposed pins 18, upon which the neck of a last 20 may be impaled to hold the last bottom side up with its bottom in a horizontal position in a plane represented by the line a—a (Fig. 2), for movement along a direction represented by the line b—b (Fig. 1), which coincides with the center line of the shoe from tip to heel.

The assembled shoe 22 is mounted on the last so that its bottom structure 24, which may be made up of several layers of rubber or plastic, the outermost or tread layer of which is represented at 26, and which may be bounded by a foxing strip 28 and one or more reinforcing strips, may be rolled and compacted to unite and consolidate the several layers and to eliminate in so far as possible bubbles, air spaces, wrinkles and the like. To this end there is mounted on the frame above the plane of the bottom of the shoe an operating instrumentality 30 (Fig. 2), which is in the form of a pneumatic annular cushion 32 mounted on a hub 34 which in turn is fast to a horizontally arranged shaft 36, extending transversely of the conveyor and journaled at the lower ends of a U-shaped frame 38 (Fig. 3). The U-shaped frame 38 has vertically spaced, laterally extending lugs 40 arranged to slide in laterally spaced, vertically extending grooves 42 formed in a second U-shaped frame member 44, which is fastened to the base frame 10. A stem 46 is fastened to the horizontal cross portion of the U-shaped frame which has on it rack teeth 48. A shaft 50 is journaled on the second U-shaped frame 44 and has on it a gear which is engaged with the rack 48. A multispindle handle 52 fast to the shaft 50 provides means for rotating the gear and for thereby raising and lowering the U-shaped frame 38 and hence adjusting the heightwise position of the roller 30 with reference to the conveyor. The pneumatic cushion of the roller 30 may, for example, be a large low pressure inner tube such as is commonly used for tires of large size, which is comparatively soft and elastic and will take the form of the bottom of the shoe when the latter is pressed against it. As illustrated in Fig. 2, the cushion 32 is adjusted with reference to the plane a—a of the bottom of the shoe so that a portion of its peripheral surface 54 lies in the path of the shoe and below the plane of the bottom as it is advanced thereto. As the tread surface of the bottom moves into engagement with the peripheral surface of the cushion the latter is deflected upwardly and has rolling contact with the tread surface of the bottom of the shoe while the latter is passing under it. The peripheral surface 54 is sufficiently broad so that it not only has contact with the entire width of the tread surface but overhangs, that is, wraps around the opposite sides as shown in Figs. 4 and 5, portions of the cushion operating on the sides of the shoe the same time that the bottom is being rolled and compacted to hold the foxing and/or other layers at the sides in place and apply a mild pressure thereto. The amount of pressure applied perpendicular to the bottom of the shoe may be varied by the heightwise adjustment of the cushion as well as the amount of wrap around which applies pressure to the sides.

Figures 6, 7:
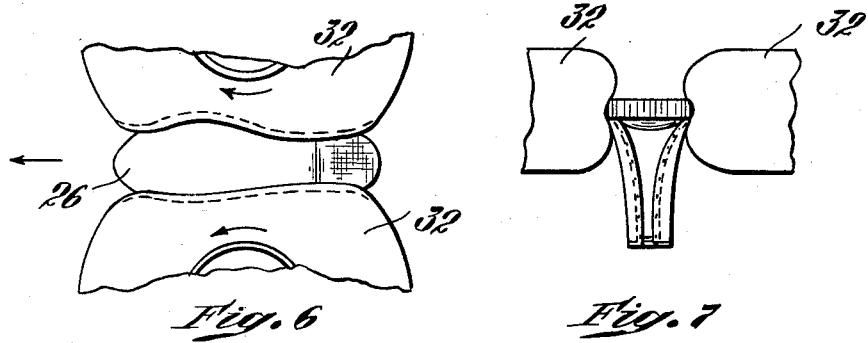
Fig. 6 is a fragmentary plan view showing the pair of consolidating rollers which operate on the sides of the shoe and overlap on to the tread surface of the bottom.
Fig. 7 is a front elevation as seen from the left-hand side of Fig. 6.

Forwardly of the tread surface engaging cushion 30 is a pair of side engaging cushions 56—56, which are arranged at opposite sides of the shoe substantially at the level of the bottom of the shoe as represented by the line a—a. Each of these cushions comprises a pneumatic tube 58 of the same kind as that described above, mounted on a hub 60 which in turn is mounted on an axle 62 disposed perpendicular to the plane of the bottom. Each axle 62 is fastened to one end of an arm 64 which, as shown in Fig. 2, is mounted at its opposite end for vertical adjustment with reference to the conveyor on a vertical screw 66. The arms 64 are thus movable laterally to and from each other and are normally urged toward each other by springs 65 connected between the arms 92 which project from the arms 64 and pins 67, the latter being fastened to the brackets 68. The screws 66 are journaled at their lower ends in brackets 68 fast to the base frame and at their upper ends in brackets 70, also fast to the base frame. A crank handle 72 is fastened to the upper end of each screw by means of which the screw may be rotated to adjust the elevation of the cushion. In their normal positions the cushions have tangential contact along the line b—b which, as previously pointed out, is substantially the center line of the path of movement of the shoe. As the shoe is advanced from beneath the first cushion it enters between the pair of cushions which operate on the sides of the shoe to roll and compact the foxing strips and other reinforcing strips which have been employed in the make-up of the bottom. At the same time portions of these rolls lap over onto the marginal portion of the tread surface, as shown in Figs. 6 and 7, so that while the edges are being compacted there is no danger that the layers on the bottom will be displaced or pushed back.

Figure 8:
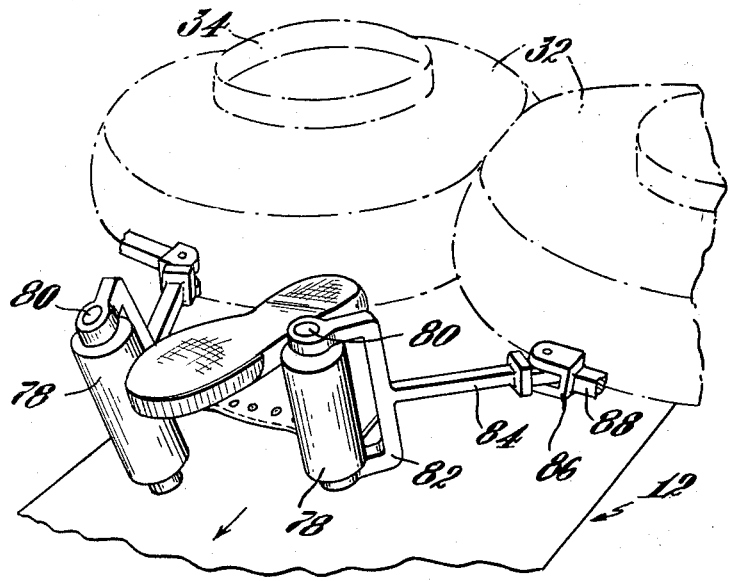
Fig. 8 is a perspective view of a shoe advanced part way between a second pair of consolidating rollers which operate exclusively on the sides of the bottom.

The cushion rollers 30 and 56 which operate on the bottom and sides respectively, are of comparatively low pressure and while they take up the irregularities in the bottom and edges greater ironing pressure and consolidating action is desirable after the initial compacting by the aforesaid cushion members, especially along the edge at the tip of the toe and at the shank. Accordingly, a second pair of rollers 76 are mounted beyond the first pair of rollers 56 in the direction of movement of the shoe. These rollers, as shown in Fig. 8, are cylinders 78, covered with sheet rubber, mounted for rotation on axles 80 which are inclined upwardly and forwardly with reference to the conveyor. The axles 80 are journaled in yoke members 82, which in turn are fixed to arms 84 pivotally supported at the ends of arms 88, the latter being fastened to the arms 64, which support the rollers 58. The arms 84 are of such length that in their normal positions the axles 80 of the rollers lie along the center line b—b in overlapping relation, as shown in Figs. 1 and 3. The rollers 78 are yieldably held in overlapping position by means of springs 90 connected to the arms 84 and to arms 92 projecting from the arms 64.

As the leading end of a shoe emerges from the cushion rolls 58 it engages the first of the rolls 78 and pushes it aside. The pressure required to overcome the spring action on the rolls 78 is however sufficient to press the foxing and/or reinforcing strips at the edge of the shoe firmly against the upper and as the toe continues the two rolls operate on opposite sides of the toe to stress the material strips rearwardly and to roll them firmly against the upper. The inclination of these rolls increases the stressing action and is particularly effective in the shank areas at opposite sides where the contour of the upper not only is concave but slopes downwardly and inwardly.

Fig. 3a shows a consolidating roll 94 with a modified tread surface 96, which may optionally be substituted for the rolls 56—56 which engage the foxing or reinforcing strips at the opposite edges so as to further minimize wrinkling these uncured strips as they are rolled and pressed into place. If desired, the roll 30 may also be replaced with a roll 94. As shown, the roll 94 is constructed by fastening a wide strip 98 of very soft rubber or rubber-like material to the surface of the tube, for example, by vulcanizing. A sponge rubber layer about one inch in thickness proved to be very satisfactory.

In operation the apparatus is run continuously so that the traveling belt or conveyor 12 moves continuously with reference to the operating instrumentalities. At one end of the conveyor an operator places lasts one after another with a shoe assembled thereon over the pins 18 and from there the shoes are conveyed to the operating instrumentalities where the bottom layers and edges are rolled and consolidated. After passing through the operating instrumentalities the shoe is delivered to the other end where it is removed by a second operator so that the process is continuous and automatic and requires only the aid of unskilled operators for loading and removing the work from the machine.

It should be understood that the present disclosure is for the purpose of illustration only and that this invention includes all modifications and equivalents which fall within the scope of the appended claims.

I claim:

1. A machine for operating on a bottom of a shoe whose bottom structure is made up of several adhesively attached layers and one or more foxing strips bounding the bottom, to consolidate the same, comprising a carrier movable along a predetermined path, said carrier mounting a shoe support for moving a shoe assembled on the support along said path bottom up in a predetermined plane and instrumentalities for operating in sequence on the bottom and foxing area as the shoe is moved along said path commencing at an end of the bottom and continuing progressively to the other end, first to apply rolling pressure principally to the bottom and secondarily to the foxing area, second to apply rolling pressure principally to the foxing area and secondarily to the marginal edge of the bottom area and thirdly to apply a rolling pressure obliquely to the foxing area principally at the toe, shank and heel portions without applying pressure to the bottom, the first of said instrumentalities being an annular tube inflated to a low pressure supported for rotation about an axis parallel to the shoe bottom and having a peripheral wall, portions of which lie above and below the plane of the path of the bottom, so that as the bottom moves beneath it the medial portion of the wall is displaced perpendicularly to the bottom and has intimate contact therewith and the lateral portions are undisplaced and overlap the foxing area at each side, the second of said instrumentalities being a pair of like annular tubes supported at opposite sides of the path of movement of the shoe bottom for rotation about axes perpendicular to the shoe bottom with their peripheral walls in tangential contact along a line corresponding to the center line of the path of movement of the shoe bottom and with their medial planes situated in the plane of the path of movement of the shoe bottom, said pair of tubes being laterally yieldable to permit the shoe to pass between them, the medial portions of the walls of the tubes being laterally deflected by the foxing area and having intimate contact therewith and marginal undeflected portions overlapping the bottom and upper, and the third of said instrumentalities being a pair of rollers, having firm peripheral walls, supported at opposite sides of the path of movement on axes inclined upwardly and in a forward direction with respect to the path of movement of the shoe, yieldingly held in overlapping relation, one behind the other, at the center line of movement, said rolls being laterally yieldable to permit the shoe to pass between them and to follow the entire peripheral edge of the bottom along the foxing area exclusively of the bottom.

2. A machine according to claim 1, wherein there is means for adjusting the heightwise position of the first instrumentalitiy and means for adjusting the heightwise position of the second and third instrumentalities simultaneously and independently of the first instrumentality.

3. A machine according to claim 1, wherein a rigid frame supports the carrier for movement of a portion of it in a horizontal plane and means mounting the instrumentalities on the frame in the order named, the means mounting the first instrumentality comprising a carriage and guides on the frame supporting it for vertical movement with respect to the plane of the shoe bottom, an axle on the carriage parallel to the shoe bottom, a hub on the axle upon which the annular tube is mounted and rack and pinion means operable to raise and lower the carriage and hence the tube relative to the shoe bottom, the means mounting the second set of instrumentalities comprising a pair of laterally spaced, perpendicular screws fixed to the frame at opposite sides of the carrier, levers threaded at one end on the screws and movable thereon in a horizontal plane laterally to and from the path of the shoe carrier and up and down on the screws, axles and hubs at their distal ends upon which are mounted the tubes and springs operable on the levers to hold them biased inwardly so that the tubes normally have tangential contact, and the means mounting the third set of instrumentalities comprising arms pivoted on said levers and having up and down movement therewith, said arms carrying axles at their distal ends on which are mounted the rollers of the third set of instrumentalities and being movable laterally independently of the levers, and springs operating on the arms normally to hold them biased inwardly with the rolls disposed behind each other.

References Cited in the file of this patent

UNITED STATES PATENTS

| | | |
|---|---|---|
| 1,218,983 | Clark | Mar. 13, 1917 |
| 1,895,921 | Ellis | Jan. 31, 1933 |
| 2,042,948 | Lewis | June 2, 1936 |
| 2,088,921 | Polleys | Aug. 3, 1937 |